(12) United States Patent
Deng et al.

(10) Patent No.: US 9,543,852 B2
(45) Date of Patent: Jan. 10, 2017

(54) METHOD AND SYSTEM FOR CONTROLLING A DC LINK VOLTAGE OF A POWER CONVERTER CONNECTING AN ELECTRIC GENERATOR OF A WIND TURBINE WITH A POWER GRID

(75) Inventors: Heng Deng, Brande (DK); Erik Groendahl, Them (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 314 days.

(21) Appl. No.: 13/367,491

(22) Filed: Feb. 7, 2012

(65) Prior Publication Data

US 2012/0205911 A1    Aug. 16, 2012

(30) Foreign Application Priority Data

Feb. 14, 2011    (EP) ..................................... 11154346

(51) Int. Cl.
*H02P 9/04*    (2006.01)
*H02M 5/45*    (2006.01)

(52) U.S. Cl.
CPC ................. *H02M 5/45* (2013.01); *Y02E 10/76* (2013.01)

(58) Field of Classification Search
CPC ......... H02P 23/04; H02P 9/10; H02P 29/0038; H02M 5/45; Y02E 10/76
USPC ..... 290/44, 55; 322/44, 24, 28, 20; 700/286, 700/287, 288, 290
See application file for complete search history.

(56) References Cited

U.S. PATENT DOCUMENTS

| | | | |
|---|---|---|---|
| 5,559,421 A | 9/1996 | Miyakawa | |
| 8,013,461 B2* | 9/2011 | Delmerico et al. | 290/44 |
| 2005/0017512 A1* | 1/2005 | Kikuchi | F03D 7/0272 290/44 |
| 2006/0232250 A1* | 10/2006 | Sihler et al. | 322/58 |
| 2007/0279012 A1* | 12/2007 | Sihler | 322/20 |
| 2010/0109328 A1* | 5/2010 | Li | F03D 9/003 290/44 |
| 2011/0140438 A1* | 6/2011 | Delmerico | H02M 5/4585 290/55 |

(Continued)

FOREIGN PATENT DOCUMENTS

CN    101304234 A    11/2008

OTHER PUBLICATIONS

Michalke et al.: "Control strategy of a variable speed wind turbine with multipole permanent magnet synchronous generator"; 2007; pp. 1-8.

(Continued)

*Primary Examiner* — Viet Nguyen

(57) ABSTRACT

A method is provided for controlling a DC link voltage of a power converter connecting an electric generator of a wind turbine with a power grid. The method includes determining the rotational speed of a rotor of the electric generator. The method further includes determining a strength of harmonic components of the rotational speed of the rotor, wherein the harmonic components have frequency components being different from a fundamental rotational frequency of the electric generator. The method also includes determining a damping reference signal as a function of the determined strength of the harmonic components, and controlling the DC link voltage of the power converter in response to the determined damping reference signal. A corresponding control system is also provided.

12 Claims, 8 Drawing Sheets

(56) References Cited

U.S. PATENT DOCUMENTS

2011/0310642 A1* 12/2011 Dai et al. .................. 363/37

OTHER PUBLICATIONS

Hansen A D et al.: "Multi-pole permanent magnet synchronous generator wind turbines' grid support capability in uninterrupted operation during grid faults", IET Renewable Power Generation, vol. 3, No. 3, pp. 333-348, ISSN: 1752-1424; Sep. 8, 2009.
Wei Qiao et al.: "Coordinated Reactive Power Control of a Large Wind Farm and a STATCOM Using Heuristic Dynamic Programming", IEEE Transactions on Energy Conversion, vol. 24, No. 2, pp. 493-503, Jun. 1, 2009, ISSN: 0885-8969.
Wei Qiao: "Dynamic Modeling and Control of Doubly Fed Induction Generators Driven by Wind Turbines", Power Systems Conference and Exposition, University of Nebraska, IEEE 2009, ISBN: 978-1-4244-3810-5; Mar. 15, 2009.
Wei Qiao et al.: "Wind Speed Estimation Based Sensorless Output Maximization Control for a Wind Turbine Driving a DFIG", IEEE Transactions on Power Electronics, vol. 23, No. 3, pp. 1156-1169, ISSN: 0885-8993; May 1, 2008.
Van Engelen et al.: "Development of wind turbine control algorithms for industrial use", ECN Publications, ECN Wind Energy; pp. 1-4; Jan. 9, 2001.
"Signal Smoothing-in-Control-Loops", SIMATIC PCS 7; Application &Tools—SIEMENS; Version 1.0; pp. 1-27, Sep. 2010.

* cited by examiner

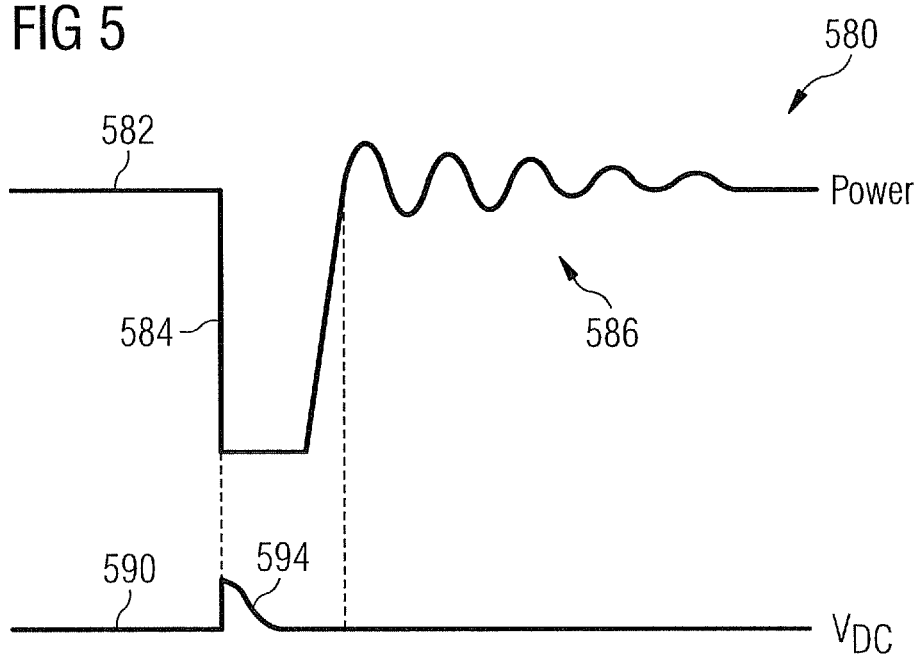
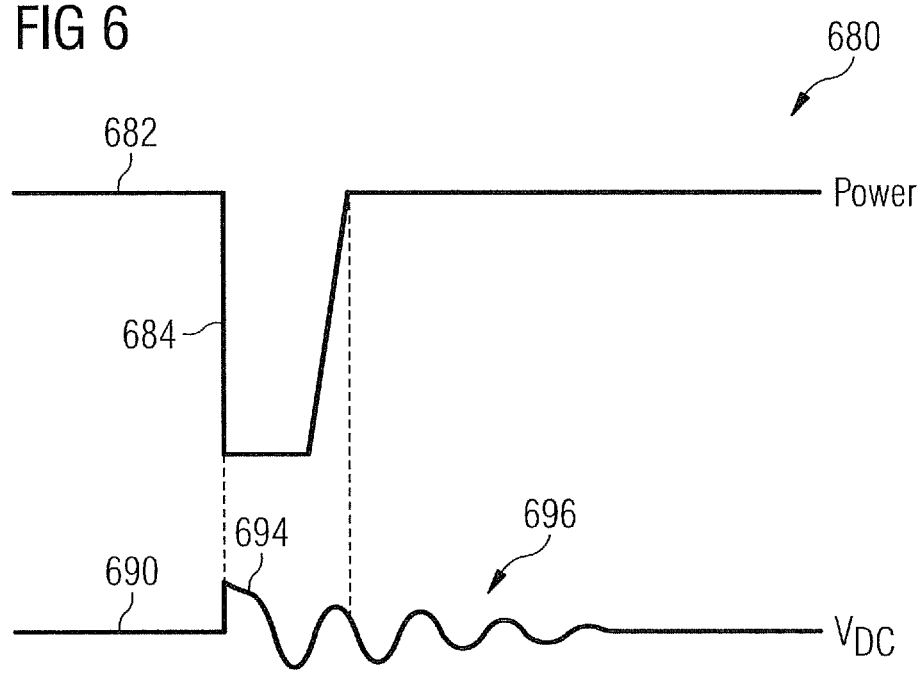

METHOD AND SYSTEM FOR CONTROLLING A DC LINK VOLTAGE OF A POWER CONVERTER CONNECTING AN ELECTRIC GENERATOR OF A WIND TURBINE WITH A POWER GRID

CROSS REFERENCE TO RELATED APPLICATIONS

This application claims priority of European Patent Office application No. 11154346.8 EP filed Feb. 14, 2011. All of the applications are incorporated by reference herein in their entirety.

FIELD OF INVENTION

The present invention generally relates to the technical field of operating wind turbines. In particular, the present invention generally relates to a method and to a system for controlling a DC link voltage of a power converter connecting an electric generator of a wind turbine with a power grid. The present invention further related to a computer program for carrying out the described method.

ART BACKGROUND

Wind power generation has received a major impetus due to ever increasing demand for energy, depleting fossil fuel reserves and environmental benefits in particular with respect to the emission of greenhouse gases.

A wind turbine comprises a drive train, which includes all mechanical components, which are in a functional view connected upstream with respect to an electric generator being used for converting mechanical energy/power captured from wind into electric energy/power being supposed to be provided to a power grid. Important drive train components are e.g. rotor blade, a hub, a main shaft and, if applicable, a gearbox.

When operating a wind turbine regularly mechanical oscillations within the drive train occur. Such oscillations may cause an out-of-round operation of the electric generator which has a negative impact not only on the lifetime of the wind turbine but also on the electric quality of the energy/power being provided by the wind turbine to a power grid. Such mechanical oscillations may be so called "torque oscillations" and/or "speed oscillations". A pure torque oscillation is an oscillation, wherein in the absence of any internal movement of at least one component of the drive train a value for the torque within the at least one component varies over time. A pure speed oscillation is any oscillation, wherein in the absence of torque variations the speed of at least a part of a component of the drive train varies over time. The speed may be in particular a rotational speed, however also a translational or a combination of a translational and a rotational speed is possible. Typically, the variations over time occur periodically.

In particular in a variable speed wind turbine, mechanical oscillations of drive train and in particular of the rotor blades at resonance frequencies can be excited by grid voltage dips and/or by wind speed changes. Mechanical oscillations resulting from such perturbations can cause a trip of the wind turbine and sometimes even structure damages of components (in particular rotor blades) of the drive train. Therefore, it is necessary to damp mechanical drive train oscillations in particular in variable speed wind turbines.

A known basic principle for damping such mechanical oscillations is to control the power output of the wind turbine being fed to the power grid at drive train resonance frequencies so that mechanical oscillations at this frequency can be reduced. In this context wind turbine controllers have been proposed, which comprise appropriate electronic hardware and/or software filters being comprised within the controllers. However, when applying this kind of active damping control by means of a dedicated wind turbine controller, power oscillations at the mechanical resonance frequency of components of the drive train are sent to the power grid, which is not preferred in both a steady state operational condition and intermediate operational condition comprising a ride through a grid fault. This has the effect that it is difficult for a wind turbine operator to meet power quality requirements given by the operator of a power grid, which receives electric power from the wind turbine.

There may be a need for an effective method which allows for reducing mechanical oscillations of a drive train of a wind turbine.

SUMMARY OF INVENTION

This need may be met by the subject matter according to the independent claims. Advantageous embodiments of the present invention are described by the dependent claims.

According to a first aspect of the invention there is provided a method for controlling a DC link voltage of a power converter connecting an electric generator of a wind turbine with a power grid. The provided method comprises (a) determining the rotational speed of a rotor of the electric generator, (b) determining a strength of harmonic components of the rotational speed of the rotor, wherein the harmonic components have frequency components being different from a fundamental rotational frequency of the electric generator, (c) determining a damping reference signal as a function of the determined strength of the harmonic components, and (d) controlling the DC link voltage of the power converter in response to the determined damping reference signal.

The described control method is based on the idea that by controlling the DC link voltage of a power converter, mechanical oscillations of a wind turbine and in particular mechanical oscillations of a drive train of the wind turbine can be effectively reduced.

By controlling the DC link voltage in the described manner harmonic power, which is generated by the electric generator in response to unwanted mechanical oscillations of and/or within a drive train of the wind turbine, is not forwarded to the power grid via the power converter. Instead, this generated harmonic power is sent to the DC link of the power converter and in particular to a DC link capacitor of the power converter. Thereby, a time dependent variation of the DC link voltage arises which has a retroaction to the electric generator. This retroaction causes a mechanical damping capability of the electric generator, which is capable of effectively reducing the mechanical oscillations of and/or within the drive train, which mechanical oscillations represent(ed) the source of the unwanted generation of harmonic power.

The described damping reference signal may by for instance a damping power reference signal or a damping torque reference signal. In this respect the damping power reference signal represents a reference or nominal value for the actual damping power of the electric generator. Correspondingly, the damping torque reference signal represents a reference or nominal value for the actual damping toque of the electric generator.

The described determining of the rotational speed may be realized by means of a measurement procedure relying on the output of an appropriate rotational speed sensor, by means of an estimation procedure, wherein at least one input value is used in order to estimate the actual rotational speed at least approximately.

In this document the term "electric generator" is used for any electromechanical device, which is capable of converting mechanic energy in electric energy. For generating a magnetic field, which in accordance with basic physical principles is necessary for the energy conversion, the electric generator may have current driven coils and/or permanent magnets.

The term "power converter" may denote any electric power device, which is used for an adaptation of a variable voltage and frequency of the electric generator to a nominally fixed voltage and frequency of a power grid. A power converter includes a generator bridge, which in normal operation operates as an active rectifier in order to supply power to a DC link. The generator bridge can have any suitable topology with a series of semiconductor power switching devices fully controlled and regulated using a pulse width modulation (PWM) strategy. A power converter typically also comprises a network bridge that converts electrical energy between dc link and power grid. Since a power converter always accomplishes a frequency conversion, such power converters are often also denominated as frequency converters.

The term "DC link voltage" denotes the voltage being present at the above described DC link of the power converter.

The term "fundamental rotational frequency" may particularly denote the rotational frequency of the rotor of the electric generator, which is associated with a desired operation of the wind turbine in the absence of any mechanical oscillations within the drive train of the wind turbine. Of course, if the electric generator is used in a variable speed wind turbine, which is a preferred application field for the control method described in this document, the fundamental rotational frequency will not be constant over time.

The drive train includes any mechanical components of a wind turbine, which are in a functional view connected upstream with respect to the electric generator. Important drive train components are e.g. rotor blade, a hub, a main shaft and, if applicable, a gearbox.

As has already been described above, the harmonic power components are sent to the DC link of the power converter and not to the power grid. This may provide the advantage that grid power harmonics can be reduced effectively.

The described method is in particular suitable for wind turbines, which depending on the actual wind condition are operated with variable rotational speed of the rotor. In this context the "rotor" may denote the rotor of the wind turbine, which comprises the rotor blades being mounted to the hub, and/or the rotor of the electric generator. The wind turbine may be either a so called direct drive wind turbine, wherein the main shaft of the wind turbine rotor directly drives the electric generator, or a wind turbine comprising a gearbox, which is connected between the main shaft and the electric generator.

Descriptive speaking, the described control method may be able to damp mechanical drive train and in particular mechanical blade oscillations in a variable speed wind turbine without feeding harmonic power to grid. In order to damp the mechanical oscillation of the drive train/blade, harmonic power at resonance frequencies of drive train/blade is produced by the electrical generator. Instead of sending the produced harmonic power to the power grid, the power converter sends this harmonic power to a DC link capacitor of the DC link of the power converter which will control the respective DC link voltage varying at certain range.

According to an embodiment of the invention determining the strength of harmonic components of the rotational speed of the rotor comprises (a) receiving a signal being indicative for the actual rotational speed of the rotor and (b) filtering the signal with a filter, which is capable of suppressing at least partially frequency components corresponding to the fundamental rotational frequency. This may provide the advantage that the strength of the harmonic components of the rotational speed of the rotor can be determined easily and in an effective manner.

The described filter may be realized by means of a hardware (electronic) filter, by means of a software filter or by means of a so called hybrid filter which relies on a combination between software and hardware filtering.

The described filter may be a single filter or a filter system comprising different single filters. In particular, the described filter may comprise a high pass filter or a band pass filter.

According to a further embodiment of the invention determining the damping reference signal comprises (a) receiving the filtered signal from the filter and (b) limiting the strength the received filtered signal. This may provide the advantage that it will be ensured that the strength of the damping reference signal will be kept within technically meaningful limits and an unwanted oversteer of the DC link voltage control can be avoided.

The range into which the damping reference signal will be restricted can be defined by two limiting values, wherein the absolute value of the two limiting values is the same and the sign of the two limiting values is different.

In this respect it is mentioned that the step of determining the damping reference signal may optionally further comprise an amplification of the filtered signal with a predefined amplification gain. An appropriate amplifier may be connected preferably in between the filter and a limiting unit, which is configured to perform the described limiting procedure.

According to a further embodiment of the invention controlling the DC link voltage of the power converter is carried out in further response to the actual DC link voltage. This may provide the advantage a closed loop control is realized, which may allow for an accurate and precise control of the DC link voltage.

According to a further embodiment of the invention controlling the DC link voltage of the power converter is carried out in further response to a reference signal for the DC link voltage. This may provide the advantage that the accuracy of the DC link voltage can be even further improved.

According to a further embodiment of the invention the method further comprises filtering a measurement signal being indicative for the actual DC link voltage with a further filter, which is capable of suppressing at least partially frequency components corresponding to mechanical resonance frequencies of a drive train of the wind turbine. Thereby, the frequency components after the filter may be related to the fundamental rotational frequency and/or to harmonics of this fundamental rotational frequency. This may mean that the filter can suppress resonance frequencies/harmonics in the measured dc link voltage. Therefore, compared to the signal before the filter the signal after the filter contains weaker harmonics or less harmonics caused by mechanic resonance frequencies of the wind turbine drive train.

The further filter may be a band stop filter so that a DC link controller, which is responsible for controlling the DC link voltage, has no response to harmonic voltages being present at the DC link of the power converter. Thereby, the frequency response of the further filter may be preferably designed such that predominately only signal portions having a frequency being in the regime of the fundamental frequency and not within higher frequency regimes can pass the further filter. This may provide the advantage that bandwidth limitations of the DC link controller are removed. As a consequence, the described method will be also applicable for applications wherein the fundamental frequency is relatively high (e.g. higher than 20 Hz).

According to a further embodiment of the invention controlling the DC link voltage comprises controlling an AC-to-DC conversion being carried out in a generator bridge of the power converter. Thereby, the generator bridge may be controlled by a so caller generator control portion of the power converter controller.

According to a further embodiment of the invention a reference signal for the amount of power to be generated by the wind turbine is used for controlling a DC-to-AC conversion being carried out in a network bridge.

In other words, the described control method further takes into account a general power reference for the wind turbine. This may provide the advantage that the described control method may contribute to maintain the amount of power being generated by the wind turbine at a predetermined level, which may be given for instance by a superordinate wind farm controller controlling the general operation of a plurality of wind turbines of a wind farm.

According to a further embodiment of the invention controlling the DC link voltage comprises controlling a DC-to-AC conversion being carried out in a network bridge of the power converter. Thereby, the network bridge may be controlled by a so caller grid control portion of the power converter controller.

According to a further embodiment of the invention a reference signal for the amount of power to be generated by the wind turbine is used for controlling a AC-to-DC conversion being carried out in a generator bridge. This means that the described control method also takes into account a general power reference for the wind turbine, which may be given for instance by a superordinate wind farm controller controlling the general operation of a plurality of wind turbines of a wind farm. This may provide the advantage that the described control method may contribute to maintain the amount of power being generated by the wind turbine at a predetermined level.

According to a further aspect of the invention there is provided a control system for controlling a DC link voltage of a power converter connecting an electric generator of a wind turbine with a power grid. The provided control system comprises (a) a first determining unit for determining the rotational speed of a rotor of the electric generator, (b) a second determining unit for determining a strength of harmonic components of the rotational speed of the rotor, wherein the harmonic components have frequency components being different from a fundamental rotational frequency of the electric generator, (c) a third determining unit for determining a damping reference signal as a function of the determined strength of the harmonic components, and (d) a control unit for controlling the DC link voltage of the power converter in response to the determined damping reference signal.

Also the described control system is based on the idea that by controlling the DC link voltage of a power converter, mechanical oscillations of a wind turbine and in particular mechanical oscillations of a drive train of the wind turbine can be effectively reduced.

It is mentioned that depending on the specific application the described units of the control system may be physically different units or may be realized within at least one combined unit.

According to an embodiment of the invention the control system is realized by a power converter controller for controlling the operation of the power converter. Thereby, the power converter controller comprises (a) a first portion for controlling the operation of a generator bridge carrying out a AC-to-DC conversion within the power converter and (b) a second portion for controlling the operation of a network bridge carrying out a DC-to-AC conversion within the power converter.

Since the described generator bridge is assigned to the electric generator side or the wind turbine side of the power converter, the first portion is often denominated a generator controller. Accordingly, since the described network bridge is assigned to the power grid side of the power converter, the second portion is often denominated a (power) grid controller.

According to a further aspect of the invention there is provided a computer program for controlling a DC link voltage of a power converter connecting an electric generator of a wind turbine with a power grid. The computer program, when being executed by a data processor, is adapted for carrying out the method as set forth in any one of the preceding claims.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWING

FIG. 5 shows a diagram depicting an intermediate dip in the amount of power being transferred from a wind turbine to a power grid, which in accordance with a prior art damping procedure causes (a) a short rise in the voltage of the DC link of a power converter and (b) successive oscillations of the amount of transferred.

FIG. 6 shows a diagram depicting an intermediate dip in the amount of power being transferred from a wind turbine to a power grid, which in accordance with a damping procedure described in this document causes (a) a short rise in the voltage of the DC link of a power converter followed by successive oscillations of the voltage of the DC link and (b) a comparatively smooth behavior of the amount of transferred power after the end of the intermediate dip.

DETAILED DESCRIPTION

Figure 1:
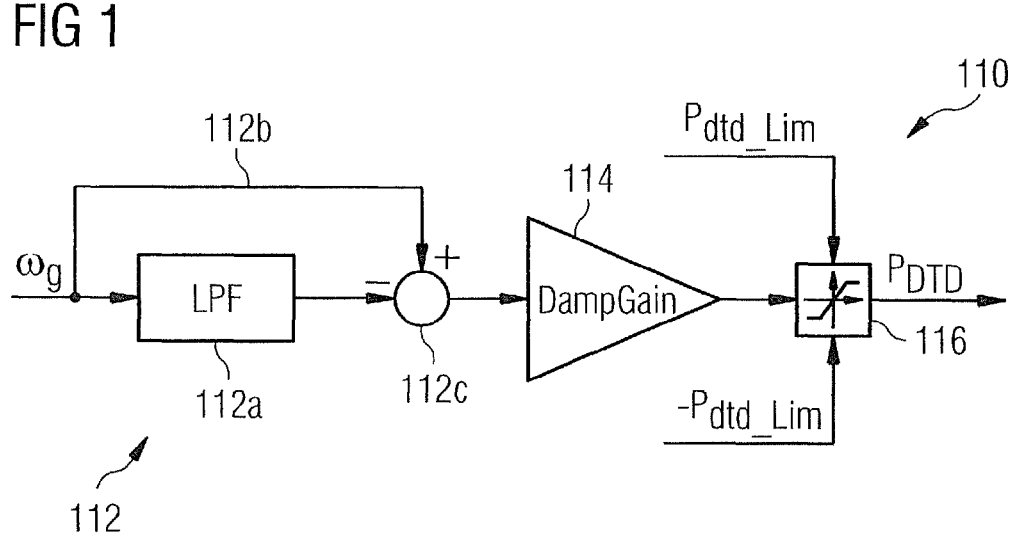
FIG. 1 shows a drive train damping controller, which provides a damping power reference signal being used by different control systems representing embodiments of the invention described in this document.

The illustration in the drawing is schematically. It is noted that in different figures, similar or identical elements are provided with the same reference signs or with reference signs, which are different from the corresponding reference signs only within the first digit.

FIG. 1 shows a drive train damping controller 110, which provides a damping power reference signal PDTD being used by different control systems representing embodiments of the invention described in this document.

The drive train damping controller 110 comprises a high pass filter 112, which receives as an input signal cog the actual rotational speed of the rotor of an electric generator (not depicted) of a wind turbine (also not depicted). The actual rotational speed cog may be measured for instance by means of an encoder and/or any type of speed/position observer and/or estimator.

According to the embodiment described here the high pass filter 112 is realized by a low pass filer 112a, a bypass line 112b and a subtracting unit 112c. Further, the output signal of the high pass filter 112 is fed to an amplifier 114, which has a predetermined gain. In FIG. 1 this gain is denominated as "damping gain" (DampGain).

As can be seen from FIG. 1, the output signal provided by the amplifier 114 is supplied to a limiting unit 116, which limits the output signal PDTD of the whole drive train damping controller 110 within a range extending from −Pdtd_Lim to +Pdtd_Lim. Limiting the damping power reference signal PDTD within a predefined range provides the advantage that an unwanted oversteer by the control systems, which are described further below, can be avoided. According to the embodiment described here the limit values −Pdtd_Lim and +Pdtd_Lim for the damping power reference signal PDTD depend on the nominal power of the respective wind turbine.

It is mentioned that the high pass filter in FIG. 1 can be replaced by other type of filter or filter systems such as a band pass filter or a combination of several high pass filters.

Figure 2:
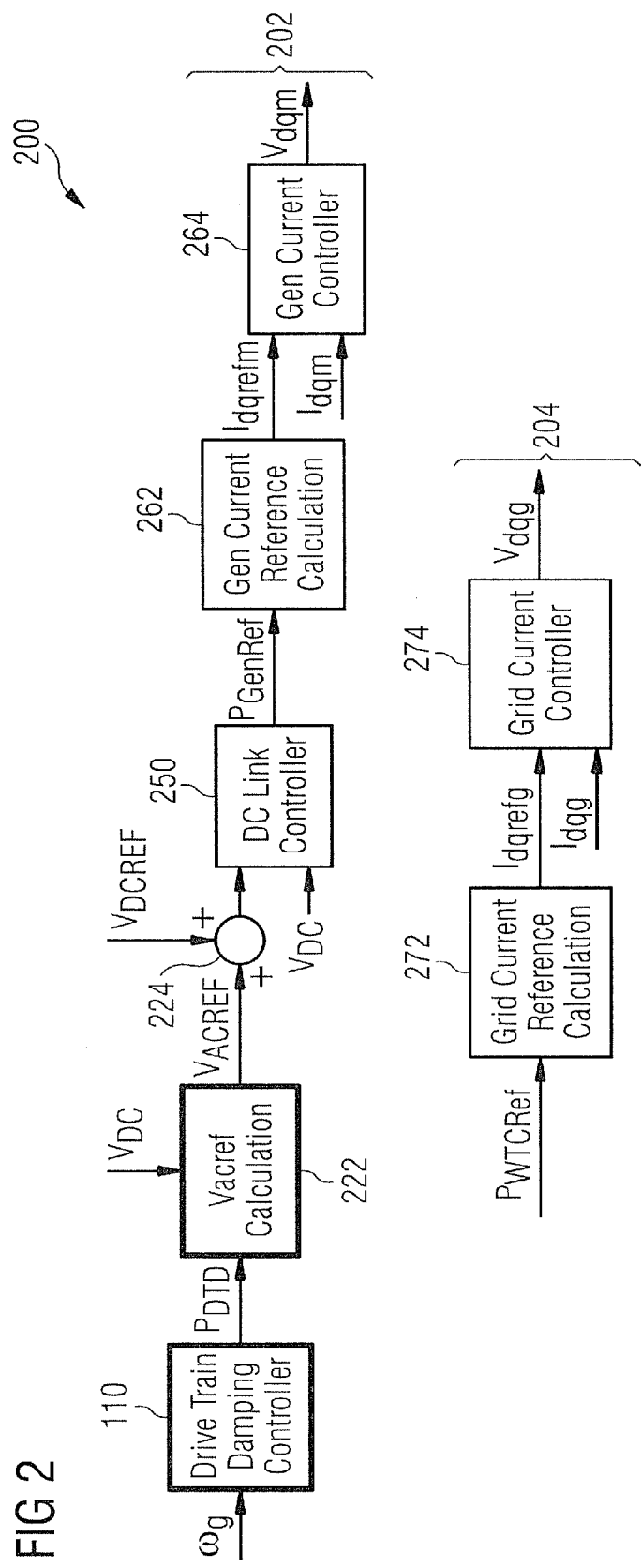
FIG. 2 shows a control system for a drive train damping procedure, wherein in accordance with a first embodiment of the invention a DC link voltage control is carried out by a generator control portion of a power converter controller.

FIG. 2 shows a control system 200 of a power converter controller (not depicted) for a drive train damping procedure. The control system 200 comprises two portions, a first portion 202, which is also denominated a generator control portion or in short a generator controller, and a second portion 204, which is also denominated a grid control portion or in short a grid controller. According to the embodiment described here, a DC link voltage control is carried out by the generator controller 202 of the power converter controller.

The control system 200 comprises the drive train damping controller 110, which is illustrated in FIG. 1 and which has been described above in detail. The damping power reference signal PDTD, which is provided by the drive train damping controller 110 in response to the actual measured and/or observed rotational speed cog of the rotor (not depicted) of the electric generator (also not depicted), is supplied to a calculation unit 222 for calculating a reference signal VACREF for the harmonic voltage. This calculation is carried out in consideration of a signal VDC being indicative for the actually measured DC link voltage.

As can be seen from FIG. 2, the reference signal VACREF for the harmonic voltage being provided by the calculation unit 222 is fed to an adding unit 224, which adds the signal VACREF to a signal VDCREF representing a reference signal for the fundamental voltage of the DC link of the power converter. The output signal from the adding unit 224 is fed, together with the above described (measured) DC link voltage VDC, to a DC link controller 250. In response to the output signal of the adding unit 224 and to the signal VDC, the DC link controller 250 determines a reference signal PGenRef for the power to be generated by the electric generator.

Further, the signal PGenRef is fed to a calculation unit 262 for calculating a generator current reference signal Idqrefm representing the reference signal for the amount of current to be generated by the electric generator. Based on this signal Idqrefm and on a signal Idqm representing the measured current generated actually by the electric generator, a generator current controller 264 determines a reference voltage signal Vdqm for a Pulse Width Modulation (PWM) of an AC-to-DC conversion being carried out in a generator bridge (not depicted) of the power converter.

It is mentioned that the power reference signal PGenRef with could also be replaced by a torque reference signal TGenRef. Further details are given below with reference to the description of FIGS. 7, 8 and 9.

It is further mentioned that the indexes "dq" are indicative for the so called direct quadrature or in short d-q rotating reference frame, which is associated with a common mathematical transformation being often used to simplify the analysis of three-phase electric circuits. In the case of balanced three-phase electric circuits, application of the d-q transformation reduces the three AC quantities to two DC quantities. As a consequence, simplified calculations can be carried out on these imaginary DC quantities before performing the inverse transform to recover the actual three-phase AC results.

The grid control portion 204 shown in FIG. 2 comprises a calculation unit 272 for calculating a power grid current reference signal Idqrefg in response to a reference signal PWTCRef for the total power to be generated by the respective wind turbine. The reference signal PWTCRef may be received for instance from a wind turbine controller (not depicted), which in known manner controls the operation of the whole wind turbine.

The signal Idqrefg, which is indicative for the amount of current being supposed to be received by the power grid (not depicted), is supplied to a grid current controller 274. As can be seen from FIG. 2, in response to the signal Idqrefg and further in response to a signal Idqg representing the measured current, which is actually received by the power grid, the grid current controller 274 determines a reference voltage signal Vdqg, which is a reference voltage signal for the Pulse Width Modulation (PWM) of a DC-to-AC conversion being carried out in a network bridge of the power converter.

Descriptive speaking, in the described control system 200 the change of DC link voltage reference VDCREF corresponding to the damping power PDTD is calculated. The DC link voltage reference VDCREF with both DC component and harmonics is sent to the DC link controller 250. The output of the DC link controller 250 is the generator power reference PGenRef. The generator power is controlled to follow this reference by the generator current controller 264 which is the inner loop of the generator controller.

The described control system 200 is in particular suitable when resonance frequency is relatively low due to the limitation of bandwidth of the DC link controller 250.

Figure 3:
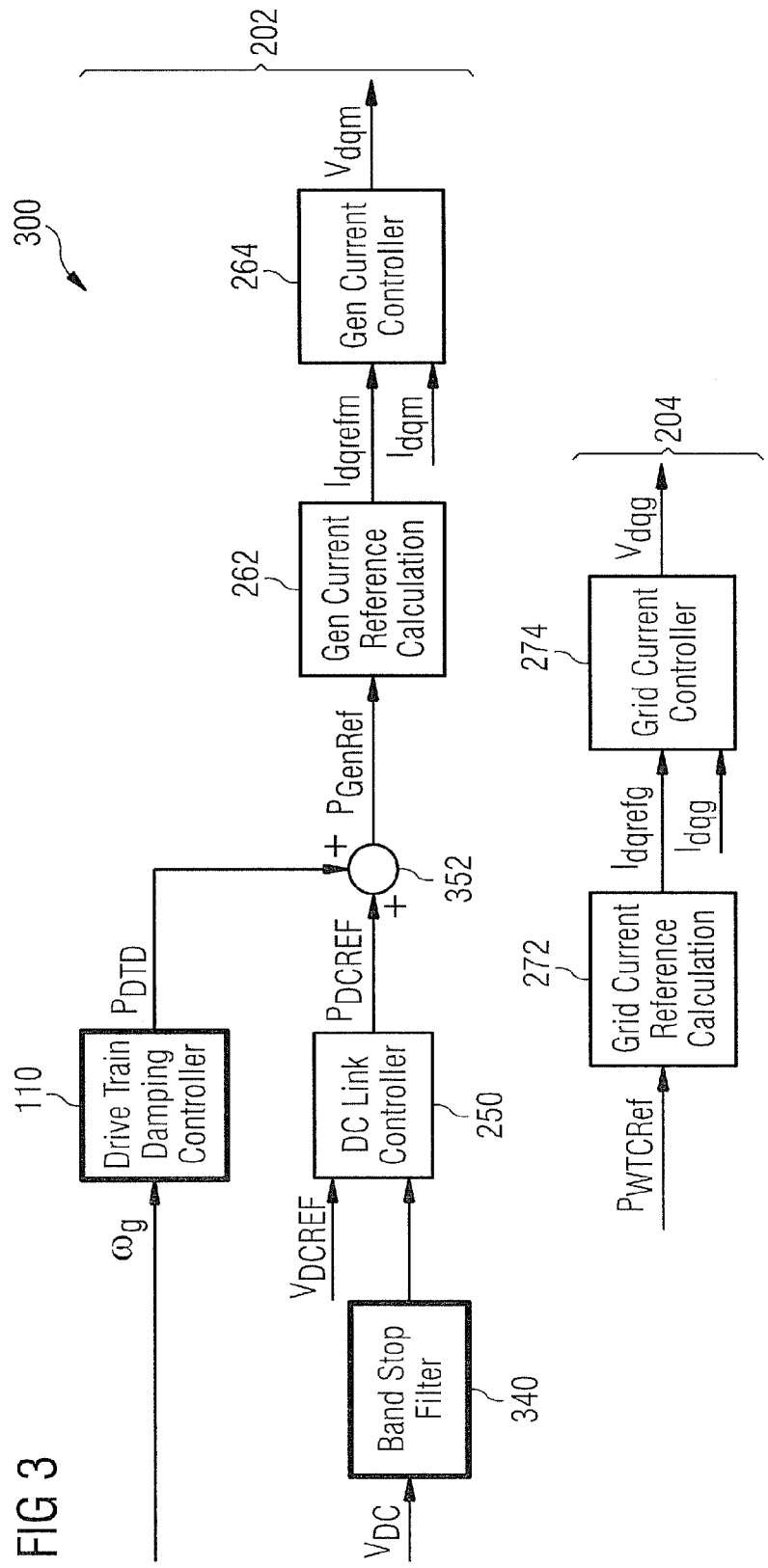
FIG. 3 shows a control system for a drive train damping procedure, wherein in accordance with a second embodiment of the invention a DC link voltage control is carried out by a generator control portion of a power converter controller.

FIG. 3 shows a control system 300 for a drive train damping procedure, wherein in accordance with the control system 200 the DC link voltage control is also carried out by the generator control portion 202 of the respective power converter controller. Compared to the control system 200 the control system 300 is more suitable when the mechanical resonance frequency of the comparatively high (e.g. more than 20 Hz).

As can be easily seen from a comparison of FIG. 2 and FIG. 3, there are significant similarities between the two control systems 200 and 300. For the sake of conciseness of this document, in the following focus is made to the differences between the two control systems 200 and 300.

The output signal PDTD of the drive train damping controller 110 is added by an adding unit 352 to the output PDCRef of the DC link controller 250 directly. The signal PDCRef can be understood as a reference signal for the fundamental power to be generated by the electric generator.

The measured feedback signal VDC of the DC link voltage is filtered by a band stop filter 340 so that the DC link controller 250 has no response to harmonic voltages of the DC link at resonance frequencies.

Figure 4:
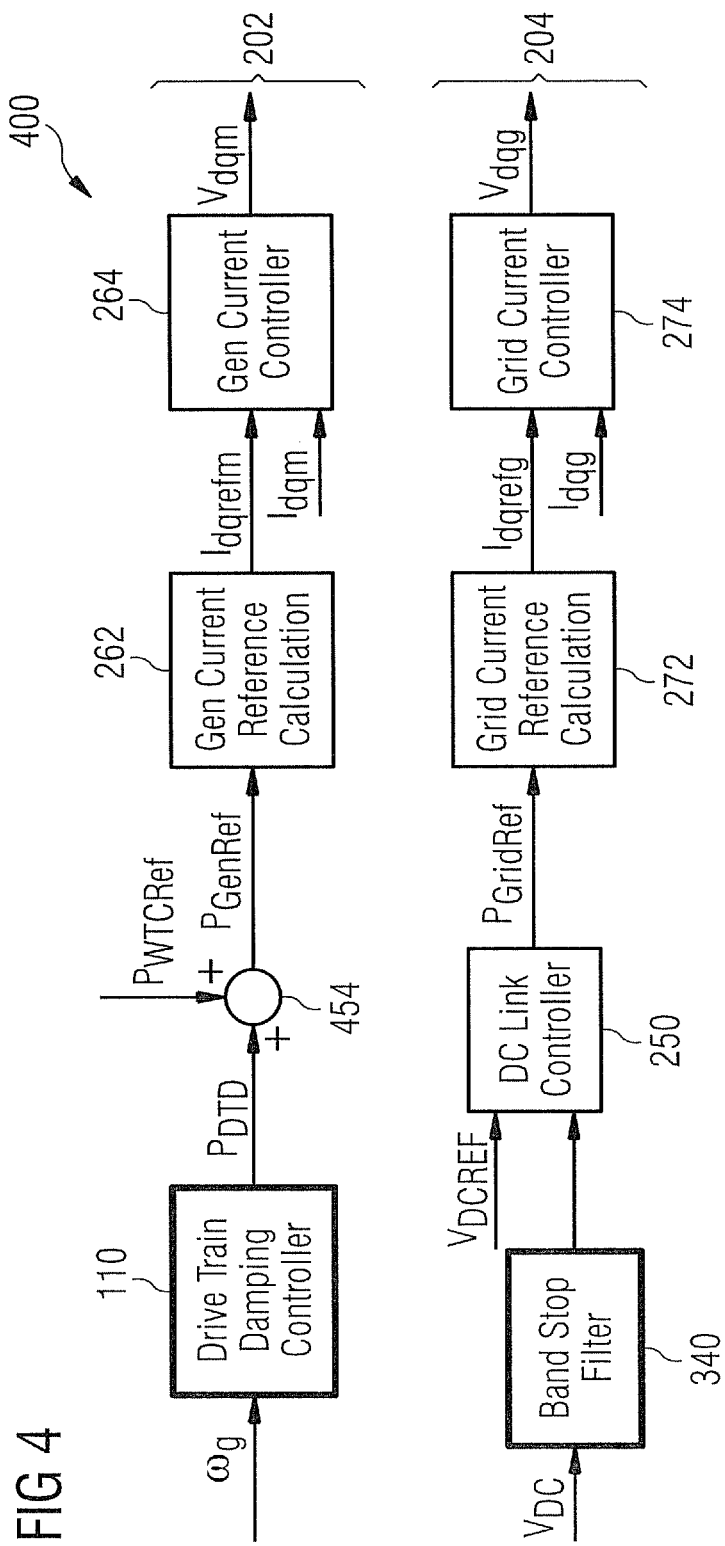
FIG. 4 shows a control system for a drive train damping procedure, wherein in accordance with a third embodiment of the invention a DC link voltage control is carried out by a grid control portion of a power converter controller.

FIG. 4 shows a control system 400 for a drive train damping procedure, wherein by contrast to the embodiments described above, the DC link voltage control is carried out by a grid control portion 204 of the respective power converter controller.

Again, there are many similarities between the control system 400 and the two control systems 200 and 300 described above. Therefore, in the following it will be focused on the differences between the two control systems 300 and 400.

As can be seen from FIG. 4, the reference signal PWTCRef for the power to be generated by the wind turbine is sent from a non depicted wind turbine controller to an adding unit 454 of the generator controller 202. The adding unit 454 adds (a) the damping power reference signal PDTD to (b) the reference signal PWTCRef, the result of which is the reference signal PGenRef for the power to be generated by the electric generator.

As can be further seen from FIG. 4, in the grid controller 204 the DC link controller 250 determines, in response to (a) the reference signal VDCREF for the fundamental voltage of the DC link of the power converter and to (b) the output signal of the band stop filter 340, a reference signal PGridRef for the amount of power to be received by the power grid.

It is again mentioned that in some applications it might be advantageous to replace the band stop filter 340 by low-pass filter.

FIG. 5 shows a diagram 580 depicting the time dependency 582 of the amount of power being transferred from the electric generator of a wind turbine to the power grid, when a conventional control procedure for controlling the operation of a power converter connecting the electric generator and the power grid is employed.

As can be seen from FIG. 5, in case an intermediate dip 584 in the power curve 582 occurs (for instance due to an unwanted voltage dip in the power grid), a short rise 594 in the time dependency of the DC link voltage 590 appears. As can be further seen from FIG. 5, after the end of the power dip 584, comparatively strong power oscillations 586 at the mechanical resonance frequency of the drive train of the wind turbine in the power curve 582 occur. These oscillations 586 are only slowly damped in time.

FIG. 6 shows a corresponding diagram 680, which shows the same situation of a power dip 684 in the time dependency 682 of the amount of power being actually transferred from the electric generator to the power grid via the power converter, when a damping procedure in accordance with a control system as described in this document is employed.

Reference numeral 690 denominates the time dependency of the DC link voltage of the power converter. Again, the power dip 684 causes a short rise 694 of the DC link voltage 690. However, by contrast to the situation shown in FIG. 5, now there appear no oscillations in the power signal 680 after the end of the dip. Instead, damped oscillations 696 having again the frequency of the mechanical resonance of the drive train, appear in the time dependency 690 of the DC link voltage.

Figure 7:
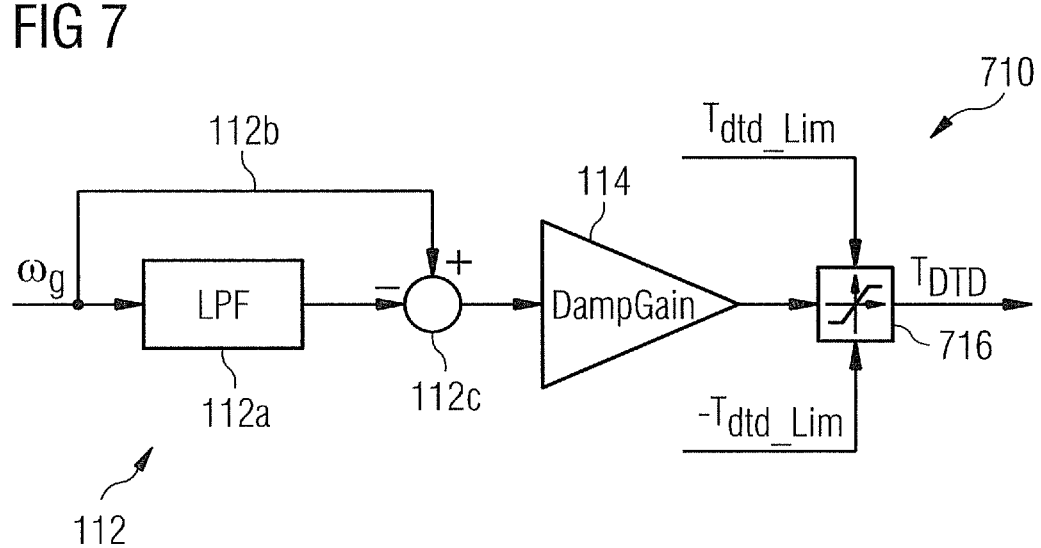
FIG. 7 shows a drive train damping controller, which provides a damping torque reference signal being used by different control systems representing embodiments of the invention described in this document.

FIG. 7 shows a drive train damping controller 710, which provides a damping torque reference signal TDTD being used by different control systems representing embodiments of the invention described in this document. The structure of the drive train damping controller 710 corresponds to the structure of the drive train damping controller 110 shown in FIG. 1. The only difference is that the output of the drive train damping controller 710 is the damping torque reference signal TDTD and not a damping power reference signal PDTD. Accordingly, a limiting unit 716 is used, which limits the output signal TDTD of the whole drive train damping controller 710 within a range extending from −Tdtd_Lim to +Tdtd_Lim.

It is mentioned that the high pass filter in FIG. 7 can be replaced by other type of filter or filter systems such as a band pass filter or a combination of several high pass filters.

Figure 8:
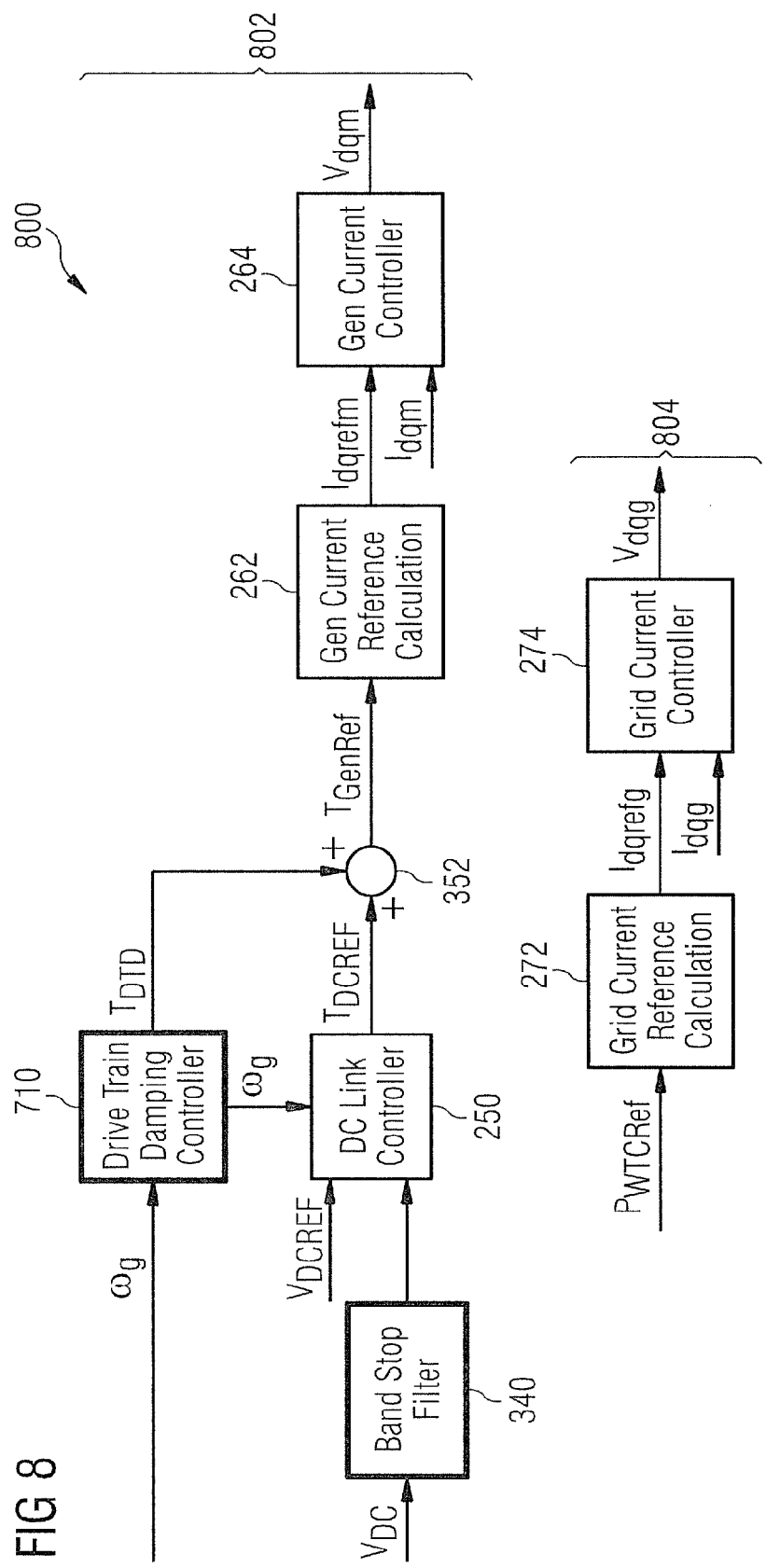
FIG. 8 shows a control system comprising the drive train damping controller of FIG. 7, wherein a DC link voltage control is carried out by a generator control portion of a power converter controller.

FIG. 8 shows a control system 800 comprising the drive train damping controller 710 shown in FIG. 7. The structure of the control system 800 corresponds to the structure of the control system 300 shown in FIG. 3. Also the control system 800 comprises two portions, a first portion 802, which is also denominated a generator control portion or in short a generator controller, and a second portion 804, which is also denominated a grid control portion or in short a grid controller. According to the embodiment described here, a DC link voltage control is carried out by the generator controller 802 of the power converter controller.

As can be seen from a comparison between the control system 800 and the control system 300 shown in FIG. 3, in the adding unit 352 there is added the damping torque reference signal TDTD provided by the drive train damping controller 710 and a reference signal TDCRef provided by the DC link controller 250. The reference signal TDCRef is indicative for the fundamental torque which is supposed to be generated by the electric generator. Further, the output of the adding unit 352 is a reference signal TGenRef for the amount of torque to be generated by the electric generator.

Apart from these differences the structures and the operations of the control system 800 and the control system 300 shown in FIG. 3 correspond to each other. Therefore, for the sake of conciseness at this point of the description reference can be made to the description above.

Figure 9:
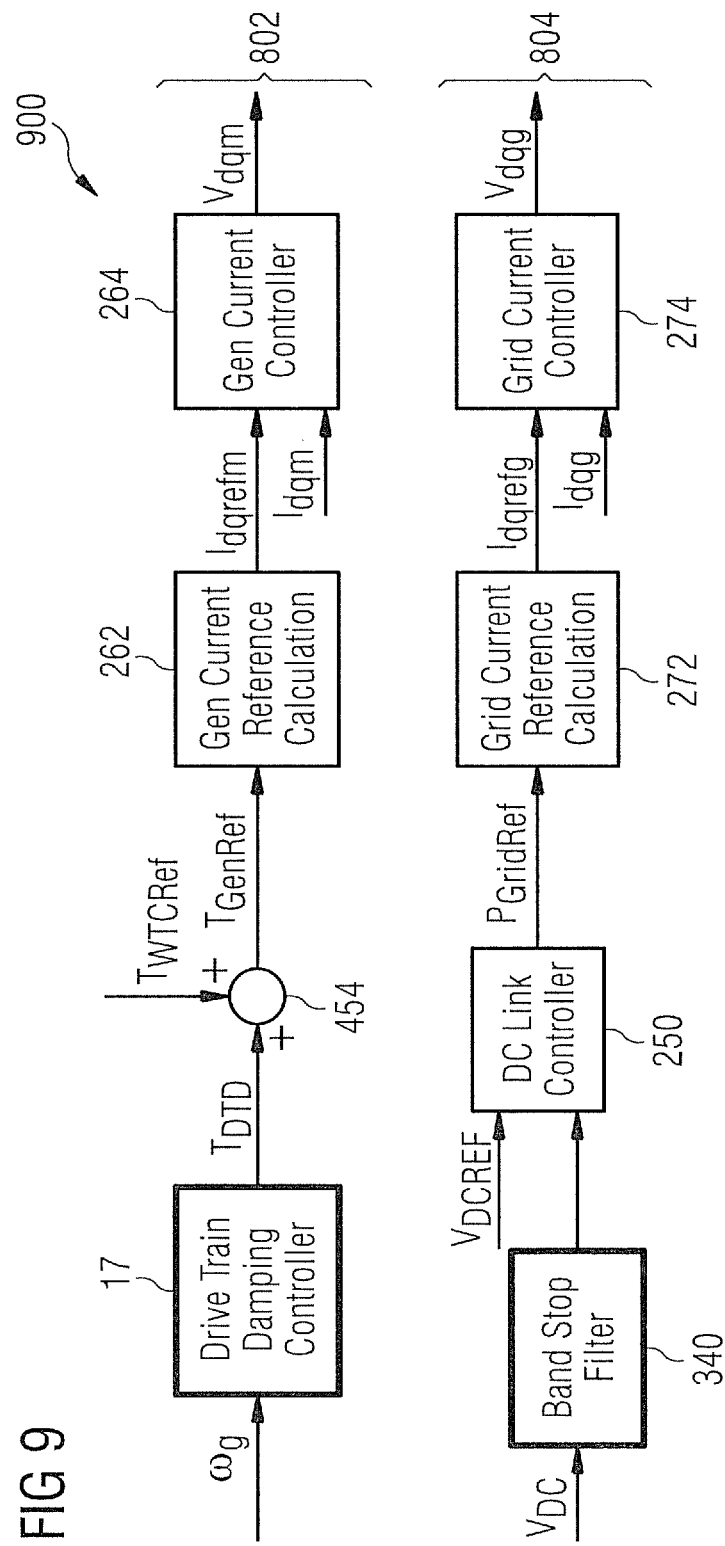
FIG. 9 shows a control system comprising the drive train damping controller of FIG. 7, wherein a DC link voltage control is carried out by a grid control portion of a power converter controller.

FIG. 9 shows a control system 900 comprising the drive train damping controller 710, wherein a DC link voltage control is carried out by the grid control portion 804 of a power converter controller. The structure of the control system 900 corresponds to the structure of the control system 400 shown in FIG. 4. The only difference is that by means of the adding unit 454 there is added the damping torque reference signal TDTD provided by the drive train damping controller 710 and a reference signal TWTCRef for the torque to be generated by the electric generator. The reference signal TWTCRef may be provided in particular by a non depicted wind turbine controller.

The output of the adding unit 454 is the reference signal TGenRef, which has already been described above with reference to the control system 800. The reference signal TGenRef is indicative for the amount of torque to be generated by the electric generator.

Apart from these differences the structures and the operations of the control system 900 and the control system 400 shown in FIG. 4 correspond to each other. Therefore, for the sake of conciseness of this document at this point of the description reference can be made to the description above.

The above elucidated embodiments of the invention presented in this document may in particular provide the following advantages:

(A) Oscillation of torque and speed of the drive train, in particular of the blades, of the wind turbine can be damped actively.

(B) Power oscillations are not forwarded to the power grid.

(C) An implementation of the invention into actual available power converters can be realized by means of software. Therefore, there are no or only a negligible additional costs for realizing the invention in connection with available wind turbines.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A method for controlling a DC link voltage of a power converter connecting an electric generator of a wind turbine with a power grid, the method comprising:
   determining a rotational speed of a rotor of the electric generator,
   determining a strength of harmonic components of the rotational speed of the rotor, wherein the harmonic components have frequency components being different from a fundamental rotational frequency of the electric generator,
   determining a damping reference signal as a function of the determined strength of the harmonic components,
   measuring a DC link voltage in a DC link capacitor of a DC link of the power converter that connects the electric generator of the wind turbine with the power grid to obtain a measurement signal indicative of the actual DC link voltage;
   filtering the measurement signal indicative of the actual DC link voltage with a further filter effective to suppress at least partially frequency components corresponding to mechanic resonance frequencies of a drive train of the wind turbine, and
   controlling a time-dependent variation in the DC link voltage of the DC link capacitor of the power converter that connects the electric generator of the wind turbine with the power grid in response to the determined damping reference signal and further in response to the filtered measurement signal, the controlling of the variation in the DC link voltage of the DC link capacitor effective to damp the harmonic components of the rotor without feeding harmonic power to the grid.

2. The method according to claim 1, wherein determining the strength of harmonic components of the rotational speed of the rotor comprises:
   receiving a signal being indicative for the actual rotational speed of the rotor, and
   filtering the signal with a filter, which is capable of suppressing at least partially frequency components corresponding to the fundamental rotational frequency.

3. The method according to claim 2, wherein determining the damping reference signal comprises:
   receiving the filtered signal from the filter, and
   limiting the strength of the received filtered signal.

4. The method according to claim 1, wherein controlling the DC link voltage of the power converter is carried out in further response to the actual DC link voltage.

5. The method according to claim 4, wherein controlling the DC link voltage of the power converter is carried out in further response to a reference signal for the DC link voltage.

6. The method according to claim 1, wherein controlling the DC link voltage comprises controlling an AC-to-DC conversion being carried out in a generator bridge of the power converter.

7. The method according to claim 6, wherein a reference signal for the amount of power to be generated by the wind turbine is used for controlling a DC-to-AC conversion being carried out in a network bridge.

8. The method according to claim 1, wherein controlling the DC link voltage comprises controlling a DC-to-AC conversion being carried out in a network bridge of the power converter.

9. The method according to claim 8, wherein a reference signal for the amount of power to be generated by the wind turbine is used for controlling an AC-to-DC conversion being carried out in a generator bridge.

10. A computer program for controlling a DC link voltage of a power converter connecting an electric generator of a wind turbine with a power grid, the computer program, when being executed by a data processor, is adapted for carrying out the method according to claim 1.

11. A control system for controlling a DC link voltage of a power converter connecting an electric generator of a wind turbine with a power grid, the control system comprising:
- a first determining unit for determining the rotational speed of a rotor of the electric generator,
- a second determining unit for determining a strength of harmonic components of the rotational speed of the rotor, wherein the harmonic components have frequency components being different from a fundamental rotational frequency of the electric generator,
- a third determining unit for determining a damping reference signal as a function of the determined strength of the harmonic components,
- a measurement unit to measure a DC link voltage in a DC link capacitor of a DC link of the power converter that connects the electric generator of the wind turbine with the power grid to obtain a measurement signal indicative of the actual DC link voltage,
- a filter for filtering the measurement signal indicative of the actual DC link voltage, the filter effective to suppress at least partially frequency components corresponding to mechanic resonance frequencies of a drive train of the wind turbine, and
- a control unit for controlling a time-dependent variation in the DC link voltage of the DC link capacitor in the DC link of the power converter that connects the electric generator of the wind turbine with the power grid in response to the determined damping reference signal and further in response to the filtered measurement signal, the control of the variation in the DC link voltage of the DC link capacitor effective to damp the harmonic components of the rotor without feeding harmonic power to the grid.

12. The control system as set forth in claim 11, wherein the control system is realized by a power converter controller for controlling the operation of the power converter, the power converter controller comprising:
- a first portion for controlling the operation of a generator bridge carrying out a AC-to-DC conversion within the power converter, and a second portion for controlling the operation of a network bridge carrying out a DC-to-AC conversion within the power converter.

* * * * *